(12) United States Patent
Sakai

(10) Patent No.: US 8,730,528 B2
(45) Date of Patent: May 20, 2014

(54) IMAGE READING APPARATUS, IMAGE FORMING APPARATUS, AND IMAGE READING METHOD

(75) Inventor: Norikazu Sakai, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 329 days.

(21) Appl. No.: 13/105,531

(22) Filed: May 11, 2011

(65) Prior Publication Data

US 2012/0113479 A1     May 10, 2012

(30) Foreign Application Priority Data

Nov. 5, 2010   (JP) .................................. 2010-249084

(51) Int. Cl.
*H04N 1/40* (2006.01)
(52) U.S. Cl.
USPC .......... 358/447; 358/461; 358/474; 358/3.28; 382/274
(58) Field of Classification Search
None
See application file for complete search history.

(56) References Cited

U.S. PATENT DOCUMENTS

2008/0204820 A1\* 8/2008 Ito .................................. 358/461
2009/0195840 A1\* 8/2009 Oishi ............................ 358/461
2009/0207456 A1\* 8/2009 Yasunaga ..................... 358/3.28

FOREIGN PATENT DOCUMENTS

JP    2004-266512 A    9/2004
JP    2010-011297 A    1/2010

\* cited by examiner

*Primary Examiner* — Tammy Pham
*Assistant Examiner* — Keara Harris
(74) *Attorney, Agent, or Firm* — Sughrue Mion, PLLC

(57) ABSTRACT

An image reading apparatus includes an image reading unit that includes plural photoelectric conversion elements arranged therein and that reads an image using light, the light being reflected by a document transported to a read position and being received by the plural photoelectric conversion elements, a reference plate that is disposed at the read position, a correction data generating unit that generates correction data by modifying second reference data on the basis of a ratio of first reference data to the second reference data, the first reference data being obtained by the image reading unit using light reflected by the reference plate in a clean state, the second reference data being obtained by the image reading unit using light reflected by the reference plate before reading an image, and an image correcting unit that corrects the image on the basis of the correction data generated by the correction data generating unit.

7 Claims, 8 Drawing Sheets

IMAGE READING APPARATUS, IMAGE FORMING APPARATUS, AND IMAGE READING METHOD

CROSS-REFERENCE TO RELATED APPLICATIONS

This application is based on and claims priority under 35 USC 119 from Japanese Patent Application No. 2010-249084 filed Nov. 5, 2010.

BACKGROUND (i) Technical Field

The present invention relates to an image reading apparatus, an image forming apparatus, and an image reading method.

(ii) Related Art

Hitherto, in image reading apparatuses for reading an image of a document, shading correction is performed on image data that is read by an image reading unit in a first-order manner in order to eliminate the effect of uneven characteristics of an optical system and imaging system of the image reading unit. Correction data serving as a base of the shading correction is generated on the basis of white reference data, which is obtained by capturing, with the image reading unit, an image of a white reference plate provided at a document read position.

However, the white reference plate is provided in a transport path in which documents are constantly transported, and thus dust adhered onto the documents inevitably causes degradation, such as stains and blemishes, on the surface of the white reference plate. In order to obtain white reference data used for performing accurate shading correction, it is necessary to eliminate the effect of such degradation of the white reference plate.

SUMMARY

According to an aspect of the invention, there is provided an image reading apparatus including: an image reading unit that includes plural photoelectric conversion elements arranged therein and that reads an image using light, the light being reflected by a document transported to a read position and being received by the plural photoelectric conversion elements; a reference plate that is disposed at the read position; a correction data generating unit that generates correction data by modifying second reference data on the basis of a ratio of first reference data to the second reference data, the first reference data being obtained by the image reading unit using light reflected by the reference plate in a clean state, the second reference data being obtained by the image reading unit using light reflected by the reference plate before reading an image; and an image correcting unit that corrects the image of the document read by the image reading unit on the basis of the correction data generated by the correction data generating unit.

BRIEF DESCRIPTION OF THE DRAWINGS

Exemplary embodiment(s) of the present invention will be described in detail based on the following figures, wherein.

DETAILED DESCRIPTION

Figure 1:
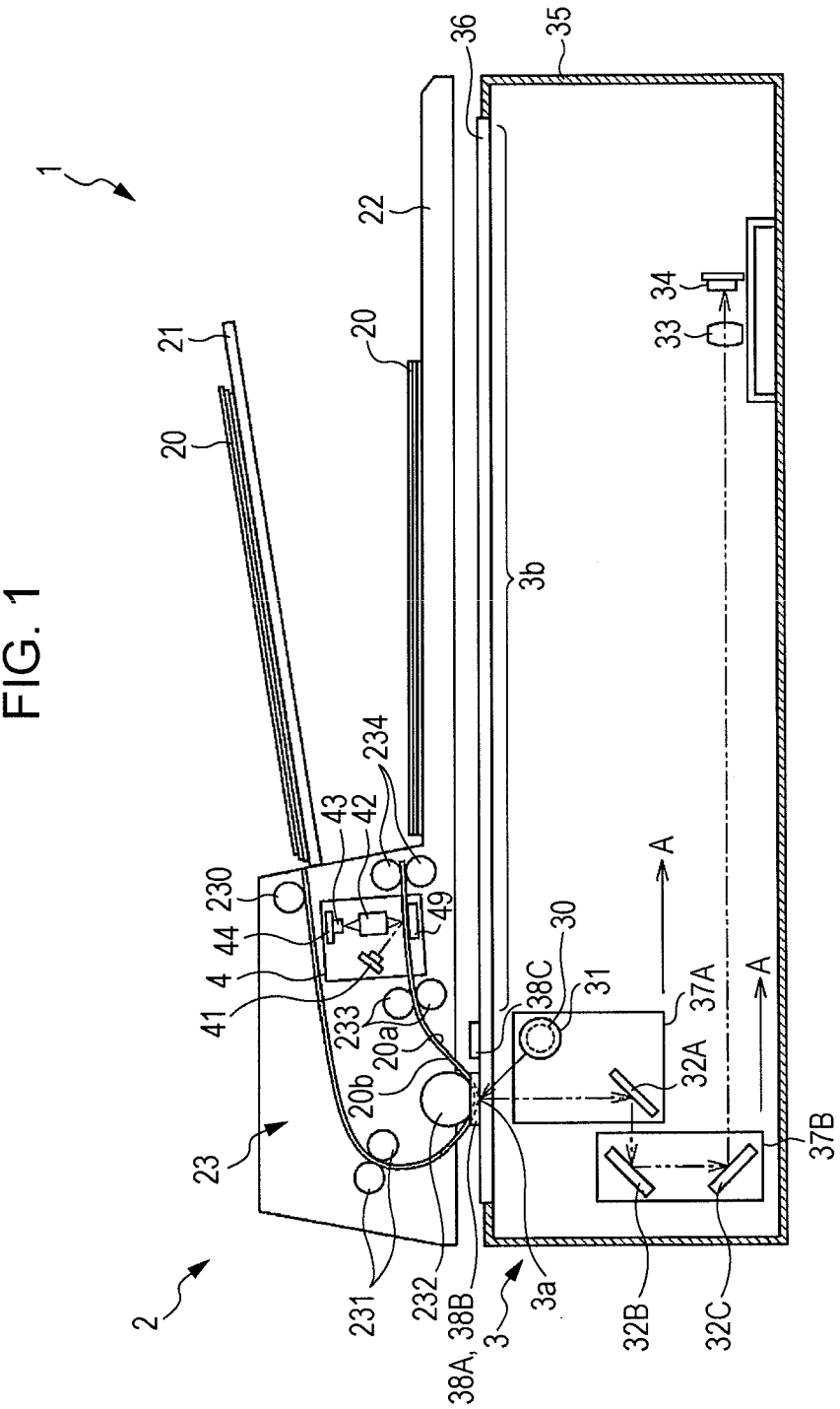
FIG. 1 is a diagram illustrating an example configuration of an image reading apparatus according to a first exemplary embodiment of the present invention.

Hereinafter, exemplary embodiments of the present invention will be described with reference to the attached drawings. In the drawings, the elements having substantially the same functions are denoted by the same reference numerals, and duplicate description thereof is omitted.

First Exemplary Embodiment

FIG. 1 is a diagram illustrating an example configuration of an image reading apparatus 1 according to a first exemplary embodiment of the present invention. The image reading apparatus 1 includes a document transport unit 2 that transports a document 20, a front-surface image reader 3 that reads an image on a front surface 20a of the document 20, and a rear-surface image reader 4 that is provided in the document transport unit 2 and reads an image on a rear surface 20b of the document 20.

The image reading apparatus 1 operates in a first mode, a second mode, or a third mode. In the first mode, the positions of first and second carriages 37A and 37B for holding an optical system of the front-surface image reader 3 are fixed, and the document 20 is transported by the document transport unit 2 through a line-shaped first read area 3a in a sub-scanning direction A to read an image from the front surface 20a of the document 20. In the second mode, the document 20 is placed on a document table 36 so as to be fixed thereon, and the first and second carriages 37A and 37B are moved in the sub-scanning direction A with respect to a rectangular second read area 3b to read an image from the front surface 20a of the document 20. In the third mode, an image is read from the front surface 20a of the document 20 and an image is read from the rear surface 20b of the document 20 while the document 20 is transported by the document transport unit 2 onto the document table 36.

Document Transport Unit

The document transport unit 2 includes a feeder tray 21 on which the document 20 with images recorded thereon are placed, an output tray 22 to which the transported document 20 is output, and a transport mechanism 23 that transports the document 20 from the feeder tray 21 to the output tray 22.

The transport mechanism 23 includes a separation roller 230 that separates each of plural sheets of the document 20 placed on the feeder tray 21 from a bundle of the sheets, transport rollers 231 that transport the separated sheets of the document 20, a read roller 232 that transports the document 20 to the front-surface image reader 3, guide rollers 233 that guide the document 20 to the rear-surface image reader 4, and output rollers 234 that output the document 20 to the output tray 22.

Front-Surface Image Reader

The front-surface image reader 3 includes a light source 30 that generates illumination light, a light guiding unit 31 that guides the illumination light emitted from the light source 30 to the first or second read area 3a or 3b, first to third mirrors 32A to 32C that reflect the illumination light emitted from the light source 30 and reflected by the front surface 20a of the document 20 in the first or second read area 3a or 3b, a lens 33 of a reducing optical system for collecting the reflected light led by the first to third mirrors 32A to 32C, and a charge-coupled device (CCD) sensor 34, which is an example of a light receiving unit for receiving the light collected by the lens 33.

The front-surface image reader 3 also includes a casing 35 for accommodating the light source 30, the light guiding unit 31, the first to third mirrors 32A to 32C, the lens 33, and the CCD sensor 34. The document table 36, which is made of a light transmitting material, such as a platen glass, is provided on the casing 35.

The light source 30, the light guiding unit 31, and the first mirror 32A are fixed to the first carriage 37A, which is movable in the sub-scanning direction indicated by arrow A, and the second and third mirrors 32B and 32C are fixed to the second carriage 37B. The second carriage 37B is configured to be movable in the sub-scanning direction A with half the movement amount of the first carriage 37A so that the length of the light path extending from the surface of the document 20 on the document table 36 to the light receiving surface of the CCD sensor 34 is kept constant. The first and second carriages 37A and 37B are configured to be moved by a drive unit 39 (see FIG. 3) formed of a motor in the sub-scanning direction A when reading an image on the front surface 20a of the document 20 placed on the document table 36.

First and second white reference plates 38A and 38B are provided at both ends of the first read area 3a on the document table 36, and a third white reference plate 38C is provided near the second read area 3b along a main scanning direction B. As the first to third white reference plates 38A to 38C, white resin plates, white-coated metal plates, or the like may be used.

Rear-Surface Image Reader

The rear-surface image reader 4 is a fixed-contact-type image sensor, and includes a light source 41, a rod lens array 42, a line sensor 43, and a substrate 44, which are integrated into a unit. The light source 41 emits illumination light onto the rear surface 20b of the document 20. The rod lens array 42 collects the illumination light emitted from the light source 41 and reflected by the rear surface 20b of the document 20. The line sensor 43 receives the reflected light collected by the rod lens array 42, and is mounted on the substrate 44.

In the rear-surface image reader 4, a white reference plate 49 is disposed at a read position where the document 20 is transported, so as to face the line sensor 43. The white reference plate 49 is a reference plate for obtaining white reference data used for shading correction (described below). A white resin plate, a white-coated metal plate, or the like may be used as the white reference plate 49.

As the light source 41, plural light-emitting diodes (LEDs) arranged in the main scanning direction are used. Alternatively, a light guiding unit having LEDs at both ends may be used as the light source 41.

The rod lens array 42 is formed of an image taking lens unit in which many cylindrical single lenses are arranged in a line in the same diameter direction in close contact with each other. The direction in which the single lenses forming the rod lens array 42 are arranged matches the direction in which photoelectric conversion elements 431a, 432a, and 433a (described below) serving as imaging elements of the line sensor 43 are arranged. The light collection width of each single lens corresponds to fourteen pixels of an image read by the line sensor 43, for example.

Figure 2:
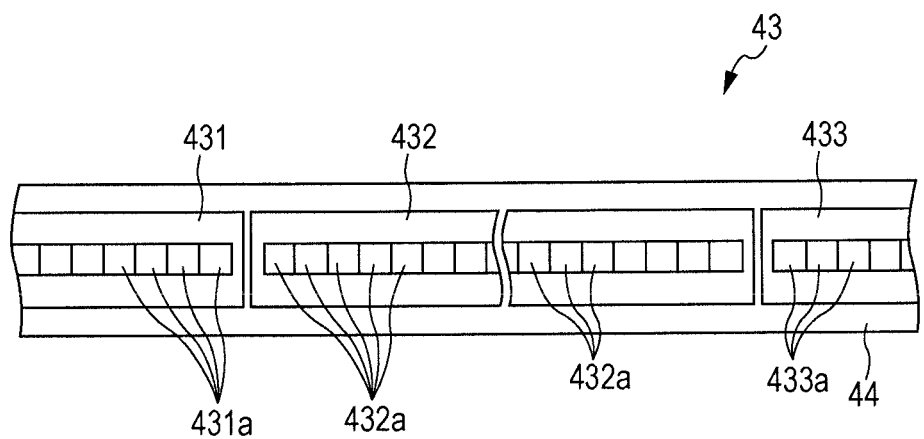
FIG. 2 is a plan view illustrating a schematic configuration of a line sensor of a rear-surface image reader of the image reading apparatus.

FIG. 2 is a plan view illustrating a schematic configuration of the line sensor 43. The line sensor 43 is constituted by a multi-chip that includes plural sensor chips 431, 432, and 433, in which many photoelectric conversion elements 431a, 432a, and 433a are formed, respectively. All the photoelectric conversion elements 431a, 432a, and 433a are arranged in the same array in an image read line direction (main scanning direction).

In the line sensor 43, sixteen to twenty-four sensor chips 431, 432, and 433 are mounted on the substrate 44. In one sensor chip 431, 304 photoelectric conversion elements 431a are formed in the same complementary metal-oxide semiconductor (CMOS) process. Thus, the sensitivity characteristics of all the photoelectric conversion elements 431a in the same sensor chip 431 may be regarded as equivalent to each other. However, if the two sensor chips 431 and 432 adjacent to each other are formed using different semiconductor wafers, a difference in the manufacturing process condition thereof may cause some variations of the sensitivity characteristics of the photoelectric conversion elements 431a and 432a of the individual sensor chips 431 and 432.

Control System

Figure 3:
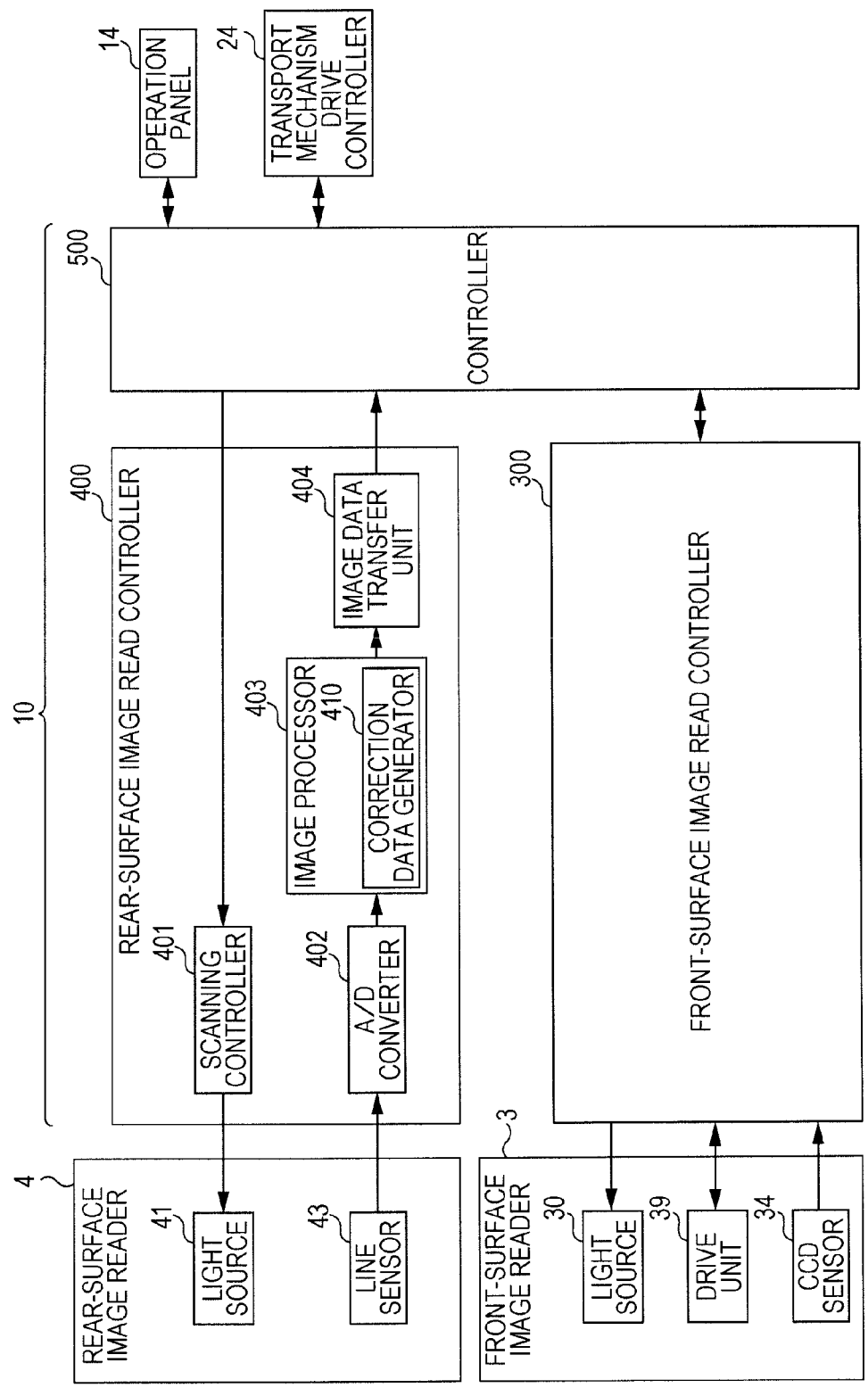
FIG. 3 is a block diagram illustrating an example configuration of a control system of the image reading apparatus.

FIG. 3 is a block diagram illustrating an example configuration of a control system of the image reading apparatus 1. The operation control in the image reading apparatus 1 is largely performed by an image read control device 10. The image read control device 10 includes a front-surface image read controller 300, a rear-surface image read controller 400, and a controller 500. The front-surface image read controller 300 controls drive of the front-surface image reader 3 and reading of the front surface 20a of the document 20. The rear-surface image read controller 400 controls reading of the rear surface 20b of the document 20 performed by the rear-surface image reader 4. The controller 500 controls the entire image reading apparatus 1.

The controller 500 is connected to an operation panel 14 and a transport mechanism drive controller 24. The operation panel 14 receives a user operation, such as an instruction to read an image. The transport mechanism drive controller 24 drives the separation roller 230, transport rollers 231, read roller 232, guide rollers 233, output rollers 234, and so forth of the transport mechanism 23 in response to a read instruction or the like.

The front-surface image read controller 300 is connected to the light source 30, the drive unit 39 for driving the first and second carriages 37A and 37B, and the CCD sensor 34 provided in the front-surface image reader 3.

The rear-surface image read controller 400 is connected to the light source 41 and the line sensor 43 provided in the rear-surface image reader 4.

The rear-surface image read controller 400 includes a scanning controller 401 that performs scanning control of the light source 41 of the rear-surface image reader 4, an A/D converter 402, an image processor 403 having a correction data generator 410, and an image data transfer unit 404.

The scanning controller 401 provided in the rear-surface image read controller 400 outputs, to the light source 41, an LED drive signal that synchronizes with a line period for reading one line of an image, an LED drive signal for obtaining white reference data used for shading correction (described below), and the like in response to an instruction provided by the controller 500.

The A/D converter 402 converts an analog image read signal output from the line sensor 43 of the rear-surface image reader 4 into read image data, which is a digital signal.

The image processor 403, which has a function of an image correcting unit, performs image processing, such as shading correction, on the read image data as a digital signal converted by the A/D converter 402 on the basis of shading correction data SD generated by the correction data generator 410.

The image data transfer unit 404 transfers the read image data on which image processing has been performed and which is output from the image processor 403 to the controller 500.

Correction Data Generator

Figure 4:
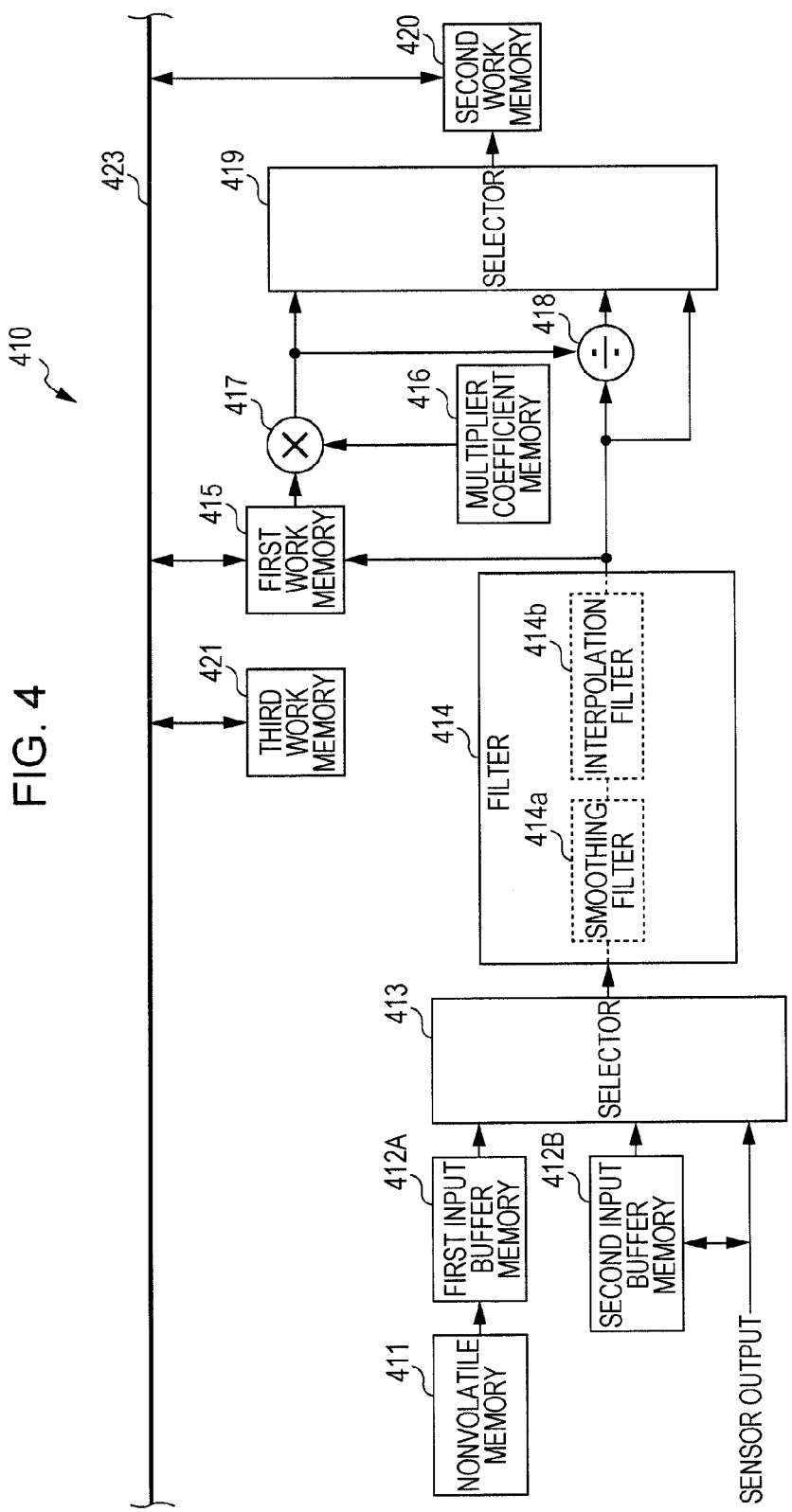
FIG. 4 is a functional block diagram illustrating an overview of the hardware configuration of a correction data generator provided in a rear-surface image read controller.

FIG. 4 is a functional block diagram illustrating an overview of the hardware configuration of the correction data generator 410, serving as a correction data generating unit, provided in the rear-surface image read controller 400. In this exemplary embodiment, digital signal processing units, such as correction data modifying units described below, in the image processor 403 and the correction data generator 410 are constituted by a hardware circuit, such as an application specific integrated circuit (ASIC). Note that all or part of these functions may be realized by a software unit with which a digital signal processor (DSP) performs operation in accordance with a certain program.

The shading correction data SD, which is the correction data generated by the correction data generator 410, is generated on the basis of the white reference data obtained by the rear-surface image reader 4.

Figure 5A:
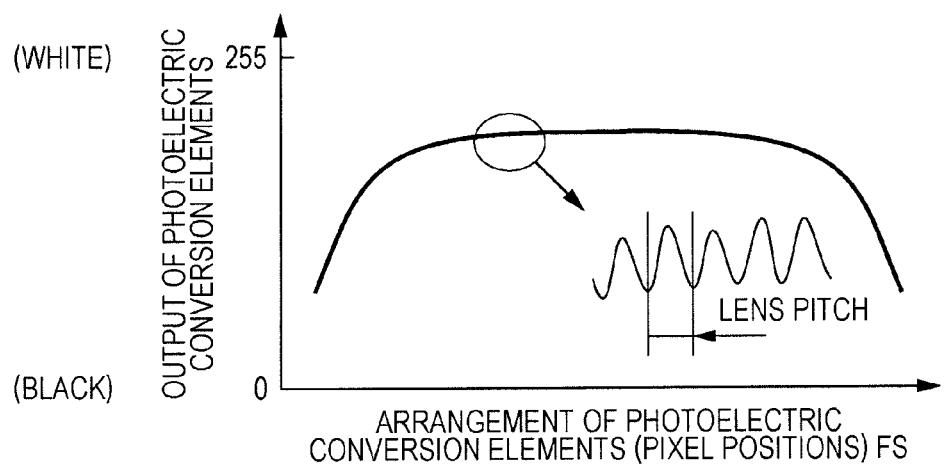
FIG. 5A illustrates an example of initial white reference data at factory shipment.

Here, "white reference data" is the sensitivity characteristic of a signal output from an image reading unit with respect to white reflected light serving as a reference. The white reference data is normally obtained by capturing, with the image reading unit, an image of a white reference plate. FIG. 5A illustrates an example of initial white reference data SD0 (first reference data) obtained by the rear-surface image reader 4. In the graph, the horizontal axis indicates the arrangement FS of the photoelectric conversion elements 431*a*, 432*a*, and 433*a* of the line sensor 43 (pixel positions), and the vertical axis indicates the output of the photoelectric conversion elements 431*a*, 432*a*, and 433*a* converted into 8-bit data. The initial white reference data SD0 is obtained by, for example, capturing an image of the white reference plate 49 without stains using the line sensor 43 at the factory shipment of the image reading apparatus 1. On the other hand, FIG. 5B illustrates an example of pre-reading white reference data SD1 (second reference data) obtained by the rear-surface image reader 4 just before reading an image of the document 20.

Figure 5B:
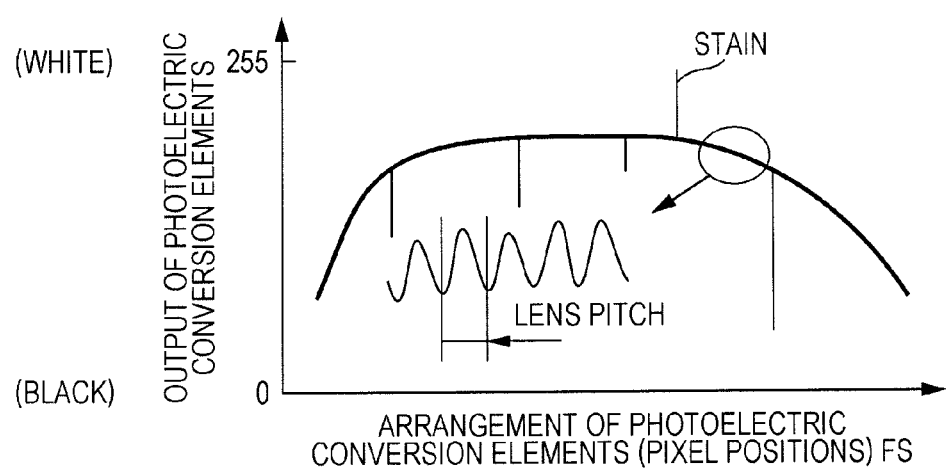
FIG. 5B illustrates an example of white reference data before reading an image.

As illustrated in FIGS. 5A and 5B, the sensitivity characteristic of the line sensor 43 with respect to white reflected light is not even, and largely degrades particularly at both ends thereof. The degradation is caused by an optical effect of reduced light at the periphery, in which the effect of diffused light becomes smaller toward the ends of the line sensor 43. Also, as represented by the white reference data SD0 and the white reference data SD1 illustrated in FIGS. 5A and 5B, periodical sensitivity fluctuations with small amplitude (swell) occur in accordance with the lens pitch of the rod lens array 42. Such periodical fluctuations are considered to inevitably occur because of a difference in the amount of collected light between the center portion and the outer periphery portion of the single lenses forming the rod lens array 42.

In the pre-reading white reference data SD1 illustrated in FIG. 5B, some portions are observed in which the sensitivity characteristic largely fluctuates at a local point due to an abnormal value. The abnormal value is considered to be generated due to stains, such as dust adhered onto the surface of the white reference plate 49, or failure of the photoelectric conversion elements 431*a*, 432*a*, or 433*a*.

The correction data generator 410 illustrated in FIG. 4 includes a first input buffer memory 412A and a second input buffer memory 412B. The first input buffer memory 412A stores the initial white reference data SD0 obtained at the factory shipment. The second input buffer memory 412B stores the pre-reading white reference data SD1 obtained just before reading an image of the document 20.

The initial white reference data SD0 is stored in advance in an external nonvolatile memory 411. When the power of the image reading apparatus 1 is turned on, the initial white reference data SD0 is loaded from the external nonvolatile memory 411 to the first input buffer memory 412A. Alternatively, an internal read only memory (ROM) of the correction data generator 410 may be provided as the first input buffer memory 412A, and the initial white reference data SD0 may be stored in advance in the internal ROM.

The second input buffer memory 412B is made up of a memory area allocated to an internal random access memory (RAM) provided in the correction data generator 410. The content of data stored therein is rewritten every time the white reference data SD1 is obtained just before reading an image.

Also, the correction data generator 410 includes first to third work memories 415, 420, and 421. These are made up of respective memory areas allocated to the internal RAM of the correction data generator 410 and are mutually connected so that data may be transmitted to one another via an internal data bus 423. The first work memory 415 stores the shading correction data SD that is finally generated on the basis of the pre-reading white reference data SD1 and the initial white reference data SD0.

Also, the correction data generator 410 includes first and second selectors 413 and 419, a filter 414, a multiplier 417, a multiplier coefficient memory 416, and a divider 418.

The first selector 413 appropriately selects and outputs any of the initial white reference data SD0 stored in the first input buffer memory 412A and the pre-reading white reference data SD1 stored in the second input buffer memory 412B.

The filter 414 has functions of a smoothing filter 414*a* and an interpolation filter 414*b*, and performs a filtering process on the white reference data SD0 or SD1 selected by the first selector 413.

The multiplier 417 performs a calculation process of multiplying the white reference data stored in the first work memory 415 by the coefficient stored in the multiplier coefficient memory 416.

The divider 418 performs a calculation process of dividing the data selected by the first selector 413 by the product obtained by multiplying, with the multiplier 417, the data stored in the first work memory 415 by the coefficient.

The second selector 419 appropriately selects and outputs the data stored in the first work memory 415, the data output from the divider 418, or the data output from the filter 414.

Operation of Image Reading Apparatus

Next, an outline of the operation performed by the image reading apparatus 1 will be described.

When a user places the document 20 on the feeder tray 21 and provides an instruction to read an image using the operation panel 14, the controller 500 receives the information about the instruction and instructs the front-surface image read controller 300 and the rear-surface image read controller 400 to read an image.

The front-surface image read controller 300 receives the instruction from the controller 500, and then controls the drive unit 39 to position the first and second carriages 37A and 37B in the first read area 3a and hold them in the first read area 3a.

The rear-surface image read controller 400 receives the instruction from the controller 500, and then the scanning controller 401 outputs an LED drive signal to the light source 41 of the rear-surface image reader 4. Then, the line sensor 43 receives the light reflected by the white reference plate 49, thereby obtaining the white reference data SD1.

The controller 500 controls the transport mechanism drive controller 24 to operate the transport mechanism 23. The transport mechanism 23 separates each of sheets of the document 20 placed in the form of a bundle on the feeder tray 21, and transports each sheet to the output tray 22 via the front-surface image reader 3 and the rear-surface image reader 4.

The front-surface image read controller 300 reads the image recorded on the front surface 20a of the document 20 that passes through the first read area 3a one line by one line in conjunction with the transport of the document 20 performed by the transport mechanism 23. That is, the front-surface image read controller 300 causes the light source 30 of the front-surface image reader 3 disposed in the main scanning direction to emit light, and receives a sensor output that is obtained when the CCD sensor 34 receives the light reflected by the front surface 20a of the document 20, the sensor output serving as an image read signal of one line.

The rear-surface image read controller 400 reads the image recorded on the rear surface 20b of the document 20 that passes through the rear-surface image reader 4 one line by one line using the line sensor 43 in conjunction with the transport of the document 20 performed by the transport mechanism 23.

More specifically, the scanning controller 401 of the rear-surface image read controller 400 causes the light source 41 of the rear-surface image reader 4 to emit light in synchronization with a line synchronization signal (periodic signal for reading and scanning one line) based on the transport speed of the document 20. Then, the line sensor 43 receives the light reflected by the rear-surface 20b of the document 20, so that an image read signal of one line of the image recorded on the rear surface 20b is output.

The A/D converter 402 converts the analog image read signal output from the line sensor 43 into read image data, which is a digital signal.

The image processor 403 serving as an image correcting unit performs image processing, such as shading correction, on the read image data converted into digital data by the A/D converter 402, on the basis of the shading correction data SD generated by the correction data generator 410.

Operation of Generating Correction Data

Figure 6:
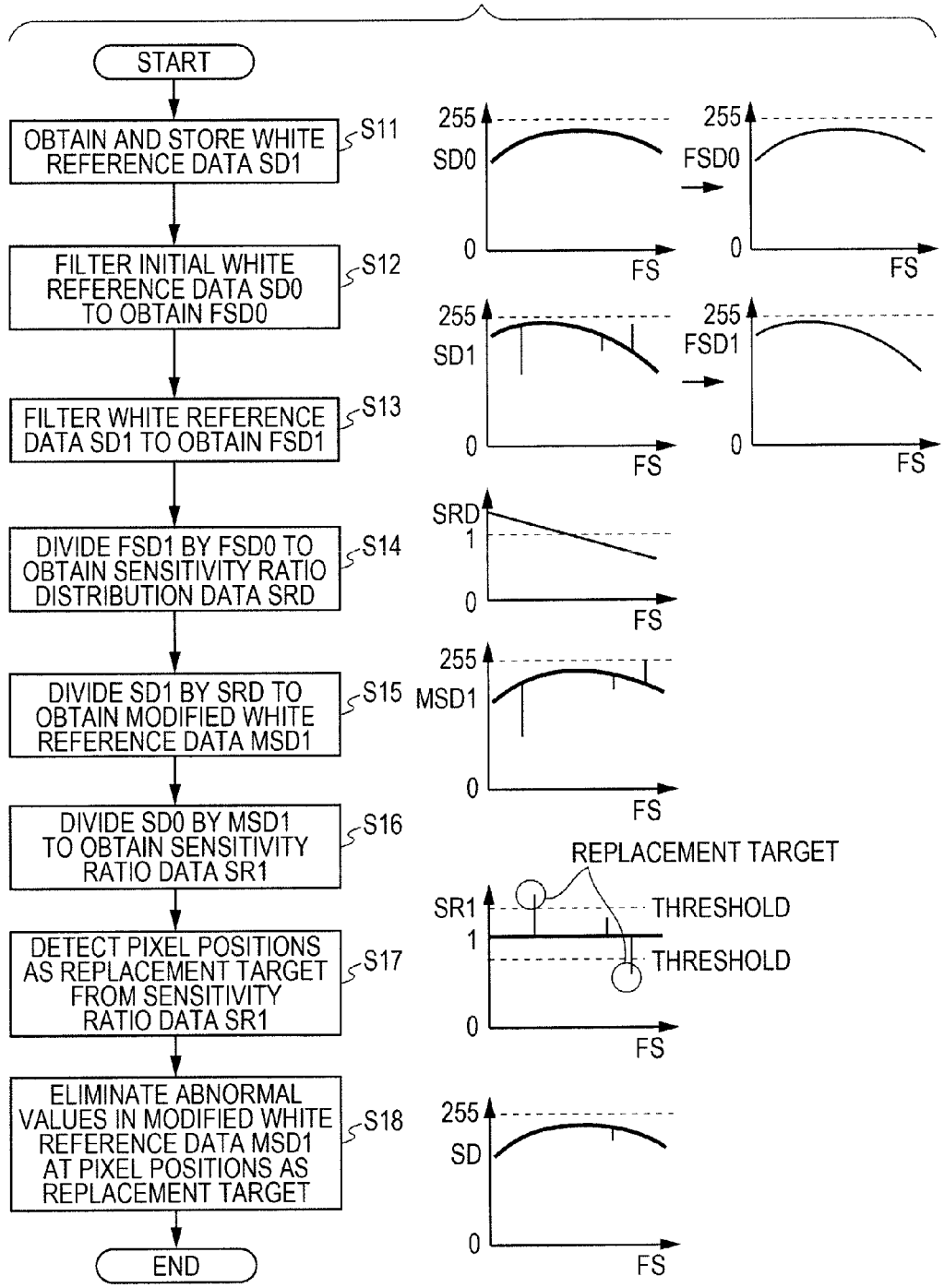
FIG. 6 is a flowchart illustrating operation of the correction data generator according to the first exemplary embodiment.

Next, an operation of generating the shading correction data SD by the correction data generator 410 will be described with reference to the functional block diagram illustrated in FIG. 4 and the flowchart illustrated in FIG. 6. For easy understanding, FIG. 6 illustrates graphs showing the rough waveforms of pieces of data handled in individual steps, together with the flowchart. The data represented by a bold line in the graphs represents that a periodical fluctuation component (swell) corresponding to the lens pitch of the rod lens array 42 is contained therein. The data represented by a thin line represents that a periodical fluctuation component has been smoothed by a filter (this is the same in FIG. 7).

A user provides an instruction to read an image using the operation panel 14, and the instruction is transmitted from the controller 500 to the rear-surface image read controller 400. Accordingly, the rear-surface image read controller 400 first causes the line sensor 43 to capture an image of the white reference plate 49, thereby obtaining pre-reading white reference data SD1. The obtained pre-reading white reference data SD1 is stored in the second input buffer memory 412B (step S11).

A first correction data modifying unit of the correction data generator 410 obtains modified white reference data MSD1 (first modified reference data) from which the effect of degradation over time, such as darkening, color fade-out, and deformation, of the white reference plate 49 has been eliminated, on the basis of the initial white reference data SD0 (first reference data) and the pre-reading white reference data SD1 (second reference data) in steps S12 to S15 in the flowchart of FIG. 6.

The first correction data modifying unit first performs a filtering process on the initial white reference data SD0 using the filter 414 (step S12). In step S12, the filter 414 smoothes the periodic fluctuation (swell) of the initial white reference data SD0 corresponding to the lens pitch of the rod lens array 42. Initial white reference data FSD0 on which the filtering process has been performed is once stored in the first work memory 415.

Subsequently, the first correction data modifying unit performs a filtering process on the pre-reading white reference data SD1 using the filter 414, thereby obtaining white reference data FSD1 (step S13). In step S13, the filter 414 smoothes the periodic fluctuation (swell) of the white reference data SD1 and eliminates a local fluctuation component of a threshold or more.

Subsequently, the first correction data modifying unit divides the filtered pre-reading white reference data FSD1 by the filtered initial white reference data FSD0 using the divider 418, thereby obtaining, in the second work memory 420, sensitivity ratio distribution data SRD (distribution data), which is distribution data of a ratio among pieces of data in the arrangement direction of the photoelectric conversion elements 431a, 432a, and 433a, that is, the pixel arrangement FS (step S14). Here, the obtained sensitivity ratio distribution data SRD is moved from the second work memory 420 to the first work memory 415.

Then, the first correction data modifying unit divides the pre-reading white reference data SD1 stored in the second input buffer memory 412B by the sensitivity ratio distribution data SRD stored in the first work memory 415 using the divider 418, thereby calculating modified white reference data MSD1 (first modified reference data) and obtaining it in the second work memory 420 (step S15). The modified white reference data MSD1 is moved from the second work memory 420 to the first work memory 415.

Subsequently, a second correction data modifying unit performs modification by eliminating a fluctuation component resulting from stains due to dust or the like on the white reference plate 49 included in the modified white reference data MSD1 in steps S16 to S18 in the flowchart of FIG. 6, thereby generating final shading correction data SD.

The second correction data modifying unit first divides the initial white reference data SD0 stored in the first input buffer memory 412A by the modified white reference data MSD1 stored in the first work memory 415 using the divider 418, thereby obtaining sensitivity ratio data SR1 in the second work memory 420 (step S16). Subsequently, the second correction data modifying unit detects, from the sensitivity ratio data SR1 obtained in the second work memory 420, pixel positions where a local fluctuation component of a threshold or more exists, the pixel positions serving as data replacement target positions. Then, the second correction data modifying unit stores position information about the pixel positions in the third work memory 421 (step S17).

Subsequently, the initial white reference data SD0 (first reference data) stored in the first input buffer memory 412A is moved to the second work memory 420. At this time, filtering by the filter 414 is not performed on the data, and the selector 419 selects the data. Thus, the data stored in the second work memory 420 is the same as the data stored in the first input buffer memory 412A.

Subsequently, the pixels that correspond to the modified white reference data MSD1 stored in the first work memory 415 and that are associated with the position information of the local fluctuation component stored in the third work memory 421 are replaced by the pixels corresponding to the initial white reference data SD0 stored in the second work memory 420 (step S18). Accordingly, highly-accurate shading correction data SD is generated.

Second Exemplary Embodiment

Next, a second exemplary embodiment of the present invention will be described. In the second exemplary embodiment, when the correction data generator 410 generates shading correction data SD, the second correction data modifying unit that operates in a manner different from that of the first exemplary embodiment modifies the white reference data SD1 using the sensitivity ratio distribution data SRD obtained by the above-described first correction data modifying unit, thereby generating the final shading correction data SD.

Figure 7:
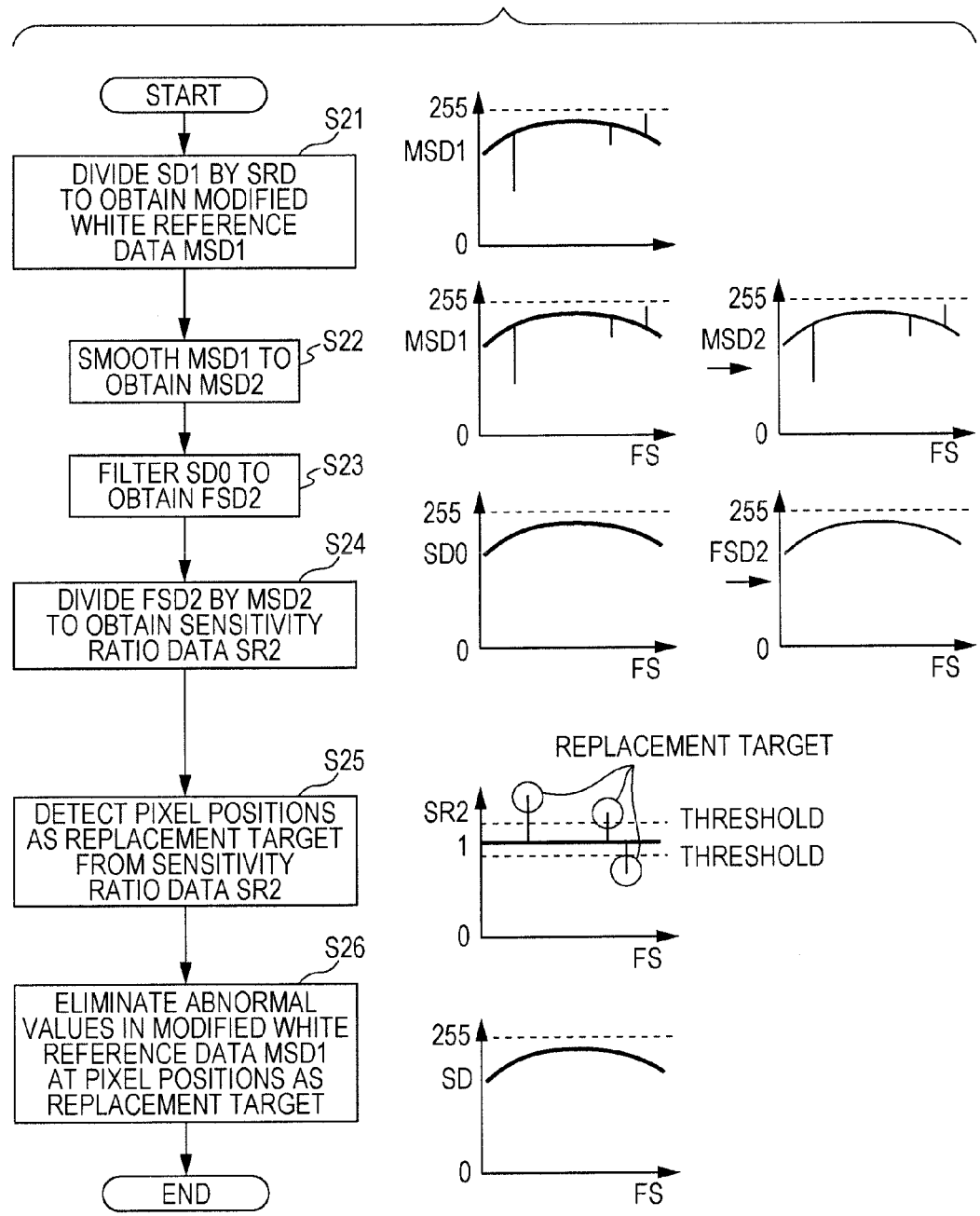
FIG. 7 is a flowchart illustrating operation of the correction data generator according to a second exemplary embodiment.

FIG. 7 is a flowchart illustrating the steps for generating the shading correction data SD by the second correction data modifying unit according to the second exemplary embodiment.

The first correction data modifying unit of the correction data generator 410 obtains the sensitivity ratio distribution data SRD in the operation similar to that in the first exemplary embodiment (steps S11 to S14 in FIG. 6), and divides the pre-reading white reference data SD1 stored in the second input buffer memory 412B by the sensitivity ratio distribution data SRD stored in the first work memory 415 using the divider 418, thereby calculating modified white reference data MSD1 and obtaining it in the second work memory 420 (step S21). The modified white reference data MSD1 is moved from the second work memory 420 to the third work memory 421.

The second correction data modifying unit divides the pre-reading white reference data FSD2, which is output from the second input buffer memory 412B and filtered, by the sensitivity ratio distribution data SRD stored in the first work memory 415, thereby calculating smoothed and modified white reference data MSD2 (second modified reference data) and obtaining it in the second work memory 420 (step S22). The modified white reference data MSD2 is moved from the second work memory 420 to the first work memory 415. Note that, in the filtering process in step S22, the modified white reference data MSD1 is smoothed, but a process of complementing a local fluctuation component is not performed.

Also, the second correction data modifying unit smoothes the initial white reference data SD0 stored in the first input buffer memory 412A using the filter 414, thereby obtaining the white reference data FSD2 serving as fourth reference data (step S23). Note that, in the filtering process performed in step S23, the initial white reference data SD0 is smoothed, but a process of complementing a local fluctuation component is not performed.

Subsequently, the second correction data modifying unit divides the filtered initial white reference data FSD2 by the smoothed and modified white reference data MSD2 stored in the first work memory 415 using the divider 418, thereby obtaining sensitivity ratio data SR2 in the second work memory 420 (step S24). Then, after moving the modified white reference data MSD1 stored in the third work memory 421 to the first work memory 415, the second correction data modifying unit detects, from the sensitivity ratio data SR2 obtained in the second work memory 420, pixel positions where a local fluctuation component of a threshold or more exists, the pixel positions serving as data replacement target positions. Then, the second correction data modifying unit stores position information about the pixel positions in the third work memory 421 (step S25).

Subsequently, the initial white reference data SD0 (first reference data) stored in the first input buffer memory 412A is moved to the second work memory 420. At this time, filtering by the filter 414 is not performed on the data, and the selector 419 selects the data. Thus, the data stored in the second work memory 420 is the same as the data stored in the first input buffer memory 412A.

Subsequently, the pixels that correspond to the modified white reference data MSD1 stored in the first work memory 415 and that are associated with the position information of the local fluctuation component stored in the third work memory 421 are replaced by the pixels corresponding to the initial white reference data SD0 stored in the second work memory 420 (step S26). Accordingly, highly-accurate shading correction data SD is generated.

Third Exemplary Embodiment

Figure 8:
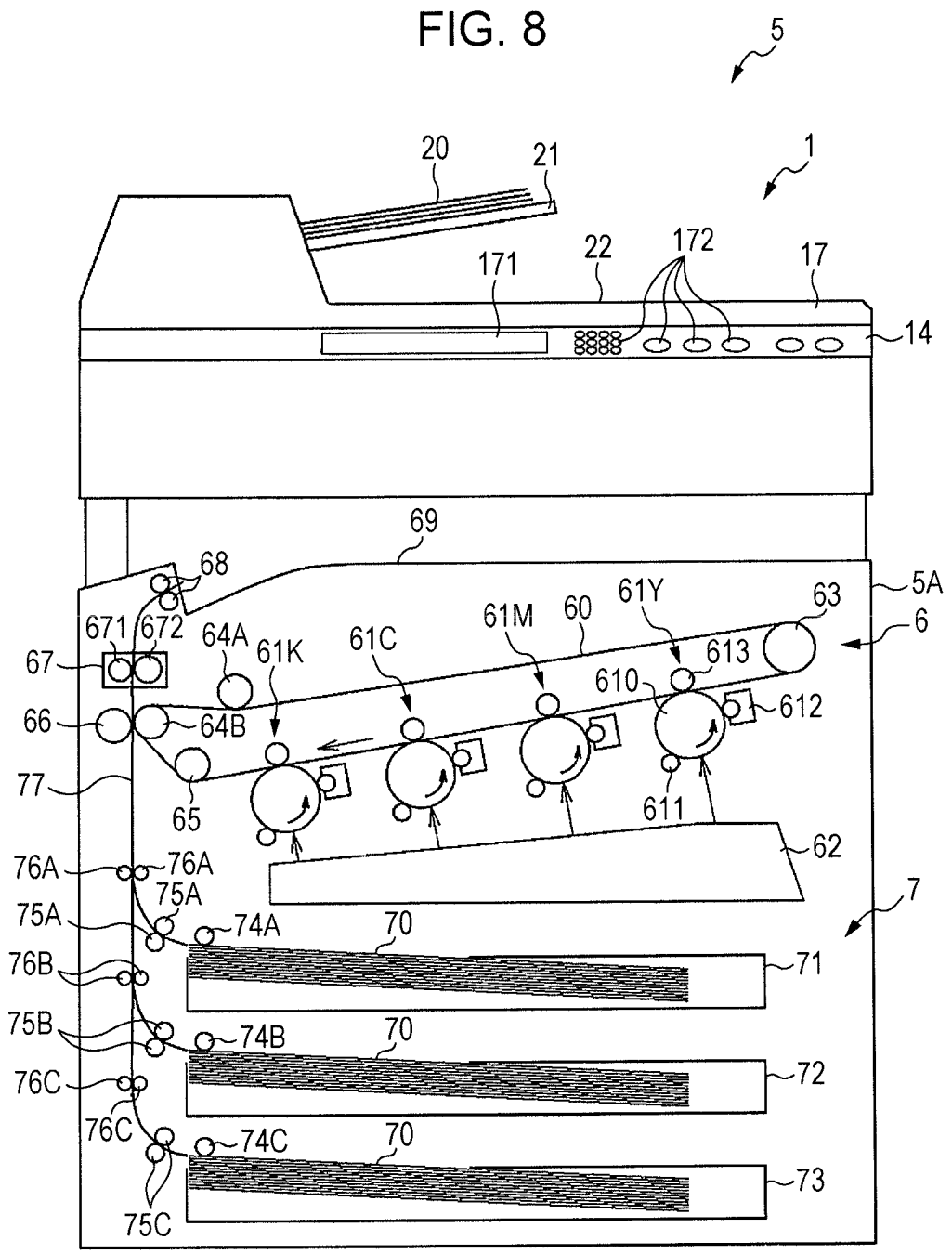
FIG. 8 is a diagram illustrating an example configuration of an image forming apparatus according to a third exemplary embodiment.

FIG. 8 is a diagram illustrating an example configuration of an image forming apparatus 5 according to a third exemplary embodiment of the present invention. The image forming apparatus 5 includes the image reading apparatus 1 according to the first or second exemplary embodiment and a body unit 5A.

The body unit 5A includes an image forming section 6 that prints a document image read by the image reading apparatus 1 on paper 70, which is a recording medium, and a tray section 7 that supplies the paper 70 to the image forming section 6.

A document cover 17 is provided with a touch panel 171 and operation buttons 172. The operation buttons 172 include a start button used for providing an instruction to read a document or print an image, a stop button used for providing an instruction to stop printing an image, and so forth.

The image forming section 6 prints a document image on paper using an electrophotographic system, and includes an intermediate transfer belt 60, first to fourth image forming units 61Y, 61M, 61C, and 61K, and an optical scanning device 62. The intermediate transfer belt 60 circulates and has no end. The first to fourth image forming units 61Y, 61M, 61C, and 61K transfer toner images of respective colors: yellow (Y); magenta (M); cyan (C); and black (K), onto the intermediate transfer belt 60. The optical scanning device 62 serves as an exposure unit that causes photoconductor drums 610 (described below) of the first to fourth image forming units 61Y, 61M, 61C, and 61K to be exposed to laser light that is modulated on the basis of image information, thereby forming electrostatic latent images on the photoconductor drums 610.

Each of the image forming units 61Y, 61M, 61C, and 61K includes a photoconductor drum 610, a charging device 611 that evenly charges the surface of the photoconductor drum 610, a developing device 612 serving as a developing unit that develops the electrostatic latent image formed on the surface of the photoconductor drum 610 by the optical scanning device 62 using toner of the corresponding color, thereby forming a toner image, and a first transfer roller 613 that presses the intermediate transfer belt 60 to the photoconductor drum 610.

The intermediate transfer belt 60 is driven by a drive roller 63 connected to a motor (not illustrated), and is rotated along a circulation path that is formed by a first driven roller 64A, a second driven roller 64B, and a tension roller 65 that gives tension to the intermediate transfer belt 60.

Also, the image forming section 6 includes a second transfer roller 66, a fixing unit 67, and output rollers 68. The second transfer roller 66 is disposed so as to face the second driven roller 64B with the intermediate transfer belt 60 therebetween, and serves as a transfer unit that transfers a toner image formed on the intermediate transfer belt 60 onto paper supplied from the tray section 7. The fixing unit 67 serves as a fixing unit that fixes a toner image transferred onto paper to the paper. The output rollers 68 output the paper 70 that has passed through the fixing unit 67 to an output tray 69.

The fixing unit 67 includes a fixing roller 671 having a heater therein, and a pressure roller 672 that applies pressure to the fixing roller 671.

The tray section 7 includes first to third trays 71 to 73 that accommodate the paper 70 of different orientations, sizes, and qualities. The tray section 7 also includes pickup rollers 74A to 74C for picking up the paper 70 from the corresponding first to third trays 71 to 73, separation rollers 75A to 75C for separating plural sheets of the paper 70 from one another when the sheets are picked up, and registration rollers 76A to 76C for transporting the paper 70 to a downstream side. The registration rollers 76A to 76C are configured to operate in synchronization with the timing of image formation performed by the image forming section 6 and guide the paper 70 picked up from the first to third trays 71 to 73 to the position between the second transfer roller 66 and the intermediate transfer belt 60 along a transport path 77.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an image reading unit that includes a plurality of photoelectric conversion elements arranged therein and that reads an image using light, the light being reflected by a document transported to a read position and being received by the plurality of photoelectric conversion elements;
   a reference plate that is disposed at the read position;
   a correction data generating unit that generates correction data by modifying second reference data on the basis of a ratio of first reference data to the second reference data, the first reference data being obtained by the image reading unit using light reflected by the reference plate in a clean state, the second reference data being obtained by the image reading unit using light reflected by the reference plate before reading an image; and
   an image correcting unit that corrects the image of the document read by the image reading unit on the basis of the correction data generated by the correction data generating unit,
   wherein the first reference data is obtained in the clean state at a first time occurring before reading the image and the second reference data is obtained at a second time occurring after the first time, and
   wherein the first time is a time at which the image reading apparatus is manufactured and the second time is a time immediately prior to reading the image.

2. The image reading apparatus according to claim 1, wherein the correction data generating unit includes a filter that smoothes the first reference data and the second reference data, a first correction data modifying unit that obtains distribution data of a ratio of the first reference data smoothed by the filter to the second reference data smoothed by the filter in an arrangement direction of the plurality of photoelectric conversion elements, and that obtains first modified reference data by dividing the second reference data by the distribution data, and a second correction data modifying unit that complements and replaces, when a ratio of the first reference data to the first modified reference data fluctuates over a threshold, a value of the first modified reference data output from the photoelectric conversion element at a pixel position where the fluctuation occurs.

3. The image reading apparatus according to claim 2, wherein the second correction data modifying unit complements and replaces, when a ratio of third reference data obtained by smoothing the first reference data to second modified reference data obtained by smoothing the first modified reference data fluctuates over a threshold, a value of the first modified reference data output from the photoelectric conversion element at a pixel position where the fluctuation occurs.

4. An image forming apparatus comprising:
   the image reading apparatus according to claim 1 that reads an image from a document;
   an exposure unit that causes a photoconductor to be exposed to light on the basis of the image read by the image reading apparatus, so as to form an electrostatic latent image on the photoconductor;
   a developing unit that develops the electrostatic latent image formed on the photoconductor to form a toner image;
   a transfer unit that transfers the toner image onto paper; and
   a fixing unit that fixes the toner image transferred onto the paper.

5. An image reading method comprising:
   reading an image by an image reading apparatus using light, the light being reflected by a document transported to a read position at which a reference plate is disposed and being received by a plurality of photoelectric conversion elements that are arranged;
   generating correction data by modifying second reference data on the basis of a ratio of first reference data to the second reference data, the first reference data being obtained using light reflected by the reference plate in a clean state, the second reference data being obtained using light reflected by the reference plate before reading an image; and correcting the image that is read in the reading on the basis of the correction data that is generated in the generating, wherein the first reference data is obtained in the clean state at a first time occurring before reading the image and the second reference data is obtained at a second time occurring after the first time, and wherein the first time is a time at which the image reading apparatus is manufactured and the second time is a time immediately prior to reading the image.

6. A method of an image reading apparatus performing shading correction on image data, the method comprising:

reflecting first light off a reference plate and generating first reference data from the first light reflected off the reference plate;

receiving an input instructing the image reading apparatus to read the image data;

in response to receiving the input, reflecting second light off the reference plate and generating second reference data from the second light reflected off the reference plate;

reading the image data; and performing the shading correction on the image data using the first reference data and the second reference data, wherein reflecting the first light is performed at a first time occurring before receiving the input and reflecting the second light is performed at a second time occurring after receiving the input, and wherein the first time is a time at which the image reading apparatus is manufactured and the second time is a time immediately prior to reading the image data.

7. The method according to claim 6, wherein the input is a user input received at an operational panel of the image reading apparatus.

* * * * *